United States Patent [19]

Pilão

[11] 4,157,669
[45] Jun. 12, 1979

[54] METHOD TO MANUFACTURE COMMINUTING DISCS FOR WOOD PULP REFINING MACHINES

[75] Inventor: Milton Pilão, Sao Paulo, Brazil

[73] Assignee: Pilão S/A Maquinas E Equipamentos, Sao Paulo, Brazil

[21] Appl. No.: 841,461

[22] Filed: Oct. 12, 1977

[51] Int. Cl.² .................................................. B21K 21/00
[52] U.S. Cl. .................................... 76/101 A; 29/460; 29/DIG. 38; 241/298
[58] Field of Search ............. 76/101 A, 101 R, 107 C; 241/296, 298; 29/460, 401 R, 434, DIG. 38, DIG. 48; 264/262

[56] References Cited

U.S. PATENT DOCUMENTS

| 2,325,746 | 8/1943 | Curtis | 76/101 A |
| 2,946,104 | 7/1960 | Martin | 264/262 X |
| 3,128,055 | 4/1964 | Michel | 241/298 |
| 3,212,365 | 10/1965 | Hardy | 76/107 C |
| 3,228,263 | 1/1966 | Bien | 76/107 C |
| 3,598,010 | 8/1971 | Chamban | 76/107 C X |
| 3,614,826 | 10/1971 | Pilao | 29/434 |

Primary Examiner—Leon Gilden
Attorney, Agent, or Firm—Michael J. Striker

[57] ABSTRACT

The method of making a comminutor plate, particularly for pulp refining machines, includes the steps of arranging at least two separate annular support members concentrically and with radial spacing from each other, a set of elongated strip-shaped blades is arranged and welded in a predetermined relative distribution on the support members. A flowable solidifiable material is introduced in the spacing between the support members. The material is permitted to solidify to thus bind the support members to each other in the radial space therebetween.

2 Claims, 5 Drawing Figures

U.S. Patent  Jun. 12, 1979  4,157,669
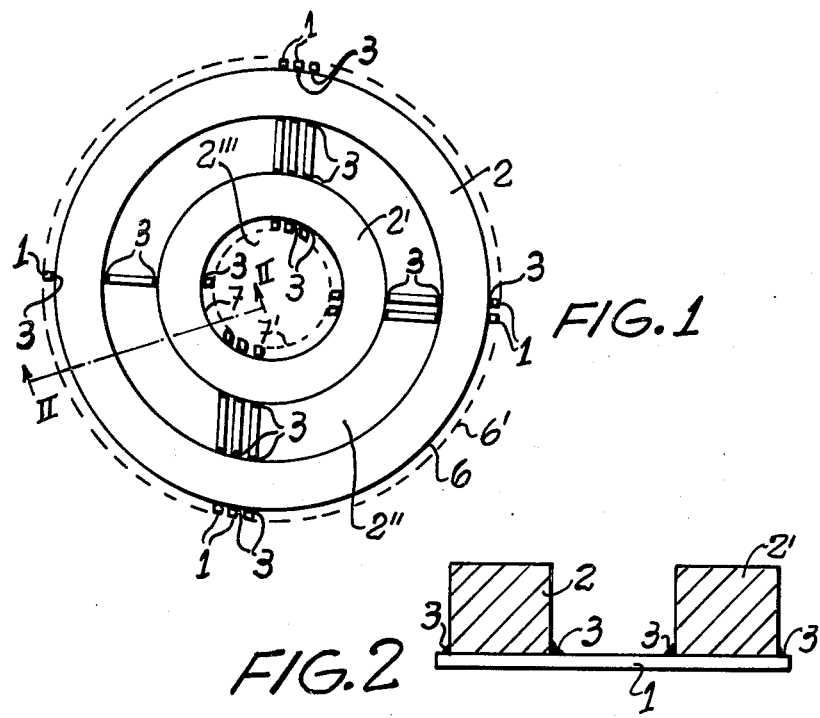
FIG.1
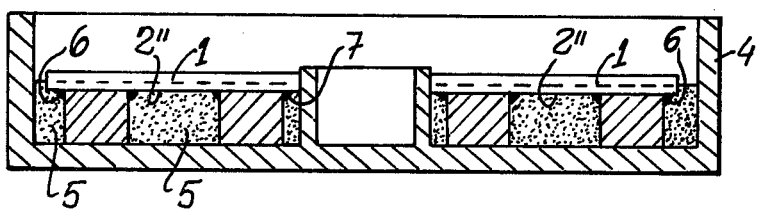
FIG.2
FIG.3
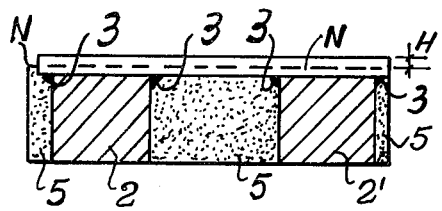
FIG.4
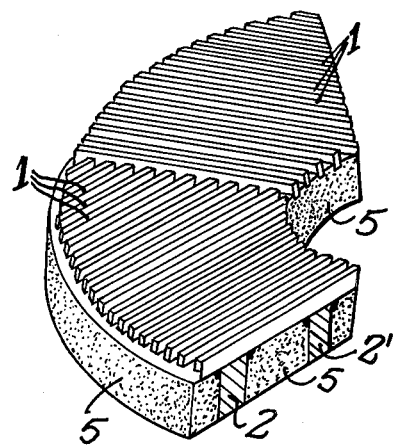
FIG.5

METHOD TO MANUFACTURE COMMINUTING DISCS FOR WOOD PULP REFINING MACHINES

BACKGROUND OF THE INVENTION

The present invention relates to a new method for the manufacture of stationary and rotary comminuting members for pulp refining machines. Usually pulp stock is admitted and pumped through the comminuting members, thus refining and cutting, as desired, the fibrous wood stock.

As is already known, the refining discs have heretofore been made by casting and subsequent machining of a thick metal plate. As taught in U.S. Pat. No. 3,614,826, Mexican Pat. No. 103,742, Argentine Pat. No. 168,209, Brazilian Pat. No. 88,035 and Canadian Pat. No. 359,387, cold rolled upgraded steel bars are welded to a low-carbon steel body in accordance with the desired pattern and size of the blades or comminuting ribs.

In spite of the fact that said rib-welded construction is a substantial improvement both from the technical and economic viewpoints over prior art, it still has some disadvantages, for example in that it requires too much time to weld the steel blades individually to the supporting plate.

Moreover, the weld ridges resulting all along the base of the ribs have to be machined, to obtain smooth surfaces in order to reduce attrition in the flowing stock.

SUMMARY OF THE INVENTION

It is a primary object of this invention to provide an improved method for the manufacture of a comminutor for a pulp refining machine, in which the supporting body is constituted by two or more concentrically spaced ring sections over which the previously cold rolled steel ribs or blades are spot welded just at the intersecting zones. The whole space within the ring sections is filled in and covered by a layer of resinous material.

Among the resulting advantages is a substantial saving of material and time for the manufacture of such a comminutor, due to the replacement of usual solid-body supporting plate with two or more concentric rings.

Another advantageous feature of this invention resides in eliminating any finishing operation of the welding area. The welding may now be carried out with carbon electrodes instead of expensive steel welding rods previously employed to resist corrosion of the refining pulp stock.

BRIEF DESCRIPTION OF THE DRAWING

FIG. 1 is a schematic top view of a comminutor in accordance with the present invention;

FIG. 2 is an enlarged sectional view taken along the line II—II of FIG. 1;

FIG. 3 is a cross-sectional view of the comminutor at one step of the method of the present invention;

FIG. 4 is an enlarged cross-sectional view of a half-section of the comminutor manufactured in accordance with the present invention; and FIG. 5 is a perspective view of a sector of the comminutor manufactured in accordance with this invention.

DESCRIPTION OF THE PREFERRED EMBODIMENTS

In FIG. 1 is shown the preparation of the disc elements over a rotary magnetic table (not shown) or similar supporting surface, over which the whole set of ribs or blades 1 was previously cold rolled and on which it is arranged in accordance with the desired pattern. The blades are spaced from one another at predetermined distances and have predetermined dimensions.

After having arranged the blades 1 over the supporting surface, the two or more ring sections 2,2' are concentrically arranged at the rear side of the blades 1 so as to define a circumferential channel 2" between each other.

Upon conclusion of this operation the rings are spot welded to each blade 1 by means of welds 3 covering the width of each blade (FIGS. 1 and 2). Such a welding is a less time-consuming operation, compared to previous techniques.

After the ribs 1 are welded to the rings 2 and 2', the resulting structure is placed into a molding device 4 (i.e., a mold) in inverted position, that is, with the ring-shaped base resting on the bottom section of the mold cavity. The mold 4 is provided with a centrally extending guide member 4'.

Then an epoxy-like resin 5 is introduced in liquid state into the mold cavity to the "N" level mark (FIG. 4) which is a little above the welding plane so as to ensure full covering and embedding of the welds 3. The comminuting blades 1 (FIG. 5) extend above the layer of resin 5 by a desired height.

The layer 5 may suitably be constituted and formed of thermoplastic resin with, for example, an aluminum alloy filler. The purpose of the filler is to complete the base plate body and to prevent corrosion of the welding spots which are kept embedded in the resin layer out of reach of the flowing wood pulp stock.

I claim:

1. A method of making a comminutor plate, particularly for pulp refining machines, comprising the steps of arranging at least two separate annular support members concentric to each other and with radial spacing from each other, so that at least one edge face of the one support member is located in a common plane with a similar edge face of the other support member; arranging a set of elongated strip-shaped blades in said plane in a predetermined relative distribution so that said blades extend over and across said support member being supported thereon and defining the comminuting surface of the comminutor plate; welding each of said support members to each of the blades along the respective surfaces thereof where the same engage the edge faces of the support members; introducing into the spacing between said support members a flowable solidifiable material so as to completely cover the welding spots between said support members and blades; and permitting said material to solidify, thus binding said two support members to each other in the radial space therebetween.

2. A method as defined in claim 1, wherein said flowable material is selected from the group consisting of epoxy resins, thermoplastic resins or aluminum alloys.

* * * * *